(12) United States Patent
Suzuki

(10) Patent No.: US 10,391,730 B2
(45) Date of Patent: Aug. 27, 2019

(54) PULSE MOTOR SYSTEM, PULSE MOTOR SYSTEM CONTROLLER, AND A NON-TRANSITORY COMPUTER-READABLE RECORDING MEDIUM RECORDING A PROGRAM

(71) Applicant: Janome Sewing Machine Co., Ltd., Tokyo (JP)

(72) Inventor: Shinji Suzuki, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 759 days.

(21) Appl. No.: 14/969,473

(22) Filed: Dec. 15, 2015

(65) Prior Publication Data
US 2016/0288442 A1    Oct. 6, 2016

(30) Foreign Application Priority Data

Mar. 30, 2015    (JP) .................. 2015-068810

(51) Int. Cl.
*B30B 15/26*    (2006.01)
*B30B 15/14*    (2006.01)
(Continued)

(52) U.S. Cl.
CPC .............. *B30B 15/26* (2013.01); *B30B 1/186* (2013.01); *G05B 19/4155* (2013.01); *G05B 2219/34016* (2013.01)

(58) Field of Classification Search
CPC ....... B30B 11/005; B30B 1/186; B30B 15/26; B30B 15/16; B30B 15/166; B30B 15/14;
(Continued)

(56) References Cited

U.S. PATENT DOCUMENTS

| 6,237,479 | B1 * | 5/2001 | Douba | B30B 1/186 100/43 |
| 6,520,077 | B1 * | 2/2003 | Minagawa | B30B 1/186 100/270 |

(Continued)

FOREIGN PATENT DOCUMENTS

| CN | 203438560 U | 2/2014 |
| JP | H07-337097 A | 12/1995 |

(Continued)

OTHER PUBLICATIONS

Office Action issued in Japanese Patent Application No. 2015-068810 dated Mar. 5, 2019 (6 pages).

*Primary Examiner* — Shelley M Self
*Assistant Examiner* — Katie L. Parr
(74) *Attorney, Agent, or Firm* — Nakanishi IP Associates, LLC

(57) ABSTRACT

A number of pulses output from an encoder is counted, a number of pulses output from a command pulse output unit is counted, and a difference between the number of pulses that has been counted by the command pulse counting unit and the number of pulses from the encoder is calculated. Then, a condition is changed such that speed/acceleration of a pulse motor increases when a difference value between a deviation threshold and the difference is smaller than a predetermined range, and the speed/acceleration of the pulse motor decreases when the difference value is greater than the predetermined range, and whereby the pulse motor is controlled based on a position of a slider detected by a slider position detection unit, a position of the slider that has been set, and the pulse condition that has been changed.

3 Claims, 8 Drawing Sheets

(51) Int. Cl.
*G05B 19/4155* (2006.01)
*B30B 1/18* (2006.01)

(58) Field of Classification Search
CPC ....... B30B 15/148; B30B 15/18; B30B 15/20; G05B 19/00; G05B 19/02; G05B 19/106; G05B 19/0405; G05B 19/042; G05B 19/0423; G05B 19/0425; G05B 19/048; G05B 19/4155; G05B 19/546; G05B 2219/34016; G05B 2219/2622; H02P 8/00; H02P 8/14; H02P 8/34; H02P 8/36; H02P 8/38
USPC ....... 100/43, 48, 50; 700/165, 206; 318/685, 318/687
See application file for complete search history.

(56) References Cited

U.S. PATENT DOCUMENTS

| | | | | |
|---|---|---|---|---|
| 7,986,120 B2 * | 7/2011 | Nakane | ............ | H02P 8/22 318/685 |
| 8,342,000 B2 * | 1/2013 | Kuboe | ............ | B30B 15/26 100/207 |
| 8,720,328 B2 * | 5/2014 | Kuboe | ............ | B30B 15/14 100/35 |
| 8,726,802 B2 * | 5/2014 | Senda | ............ | B23Q 15/18 100/48 |
| 2002/0096060 A1 * | 7/2002 | Kohno | ............ | B30B 1/186 100/35 |
| 2003/0116037 A1 * | 6/2003 | Tanaka | ............ | B30B 15/0041 100/282 |
| 2003/0137273 A1 * | 7/2003 | Davidov | ............ | H02P 8/04 318/685 |
| 2004/0170718 A1 * | 9/2004 | Futamura | ............ | B30B 1/186 425/149 |
| 2008/0034985 A1 * | 2/2008 | Suzuki | ............ | B30B 1/14 100/35 |
| 2011/0061547 A1 * | 3/2011 | Nagase | ............ | B30B 15/148 100/35 |
| 2015/0205277 A1 * | 7/2015 | Igasaki | ............ | G05B 19/404 700/275 |

FOREIGN PATENT DOCUMENTS

| | | | |
|---|---|---|---|
| JP | H10-243693 A | | 9/1998 |
| JP | 10-333751 A | * | 12/1998 |
| JP | H10-333751 A | | 12/1998 |
| JP | 2907346 B2 | | 6/1999 |
| JP | 2005-199314 | | 7/2005 |
| JP | 2008-043955 A | | 2/2008 |
| JP | 2008259273 A | * | 10/2008 |
| JP | 2010-028949 A | | 2/2010 |
| JP | 2011-098363 A | | 5/2011 |

* cited by examiner

PULSE MOTOR SYSTEM, PULSE MOTOR SYSTEM CONTROLLER, AND A NON-TRANSITORY COMPUTER-READABLE RECORDING MEDIUM RECORDING A PROGRAM

CROSS REFERENCE TO RELATED APPLICATIONS

This application is based on and claims the benefit of priority to Japanese Patent Application No. 2015-068810 filed on Mar. 30, 2015, the contents of which are hereby incorporated by reference in their entirety.

BACKGROUND OF THE INVENTION

Field of the Invention

The present invention relates to a field of industrial equipment robots, and in particular, to a servo press capable of preventing a step-out phenomenon from occurring and of realizing an improvement of takt time, as well as to a control method and a recording medium recording a program.

Description of Related Art

As a motor for driving slide blocks and robots for carrying workpieces, industrial machines such as machine tools, office automation equipment, and terminal equipment and peripheral equipment of a computer, AC and DC servomotors and pulse motors have been widely employed.

Among these, servomotors are able to move driven members such as slide blocks to a predetermined position at a predetermined speed by feedback control based on a closed loop, and therefore widely employed in driving systems of machines, such as machine tools, that require accurate positioning. On the other hand, such a servomotor, along with its peripheral equipment, tends to be increase the cost of a driving system. In contrast, with pulse motors, it is possible to perform open loop control based on signals input from outside, and to construct a driving system at a relatively low cost. Therefore their use in office automation equipment and the like have become increased.

In the meantime, a pulse motor generates torque by delaying a rotor with respect to a rotating magnetic field due to an excitation current. A delay angle of the rotor to the rotating magnetic field is referred to as a load angle, and as an inertia force and a frictional force increases, the load angle also increases. Here, if the load angle exceeds an angle when the generated torque is maximized, a total of the inertia force and the frictional force exceeds maximum torque of the motor, and the rotor may not follow the rotating magnetic field. In a case of such radical speed change or overloading, the rotor may not rotate following a command pulse, the pulse motor stops, or positional deviation occurs. This phenomenon is called step-out.

In view of such circumstances, there is disclosed a technique of alarming occurrence of step-out, in which an excitation step counter for controlling an excitation step angle based on an input pulse train signal and counting a number of excitation steps, and an encoder counter for counting output signals from a rotary encoder for detecting a rotational angle of a pulse motor and outputting an encoder counter value indicating an actual rotational angle of the pulse motor are disposed, and angular deviation of the pulse motor is calculated by comparing the number of excitation steps with the encoder counter value to determine whether or not there is step-out (e.g., PTL 1).

CITATION LIST

Patent Literatures

PTL 1: Japanese Unexamined Patent Application Publication No. H10-243693

However, as weight of a tool and a workpiece or the like is determined based on a previously set operation (speed/acceleration), in order to perform optimal control, it is necessary to make setting again in detail to change acceleration/speed required for moving a tool and a workpiece that are currently handled. Accordingly, there is an issue that an optimal state (margin of safety in operation) for the current setting may not be quantitatively obtained.

Further, as an actual state is unknown even if there is a margin of safety in operation in the currently operating state, there is another issue that it is not possible to increase the speed/acceleration, thus failing to improve takt time.

Moreover, according to the technique described in PTL 1, while it is possible to grasp the angular deviation of the pulse motor, it is not possible to determine an actual magnitude of the margin of safety in operation. As a result, there is an issue that it is not possible to improve takt time.

Furthermore, according to the technique described in PTL 1, while it is possible to alarm occurrence of step-out in advance, it is not possible to automatically prevent step-out. Therefore, there is an issue that if there is a delay in taking action, quality of processing to a workpiece deteriorates and entire takt time increases to a large extent.

SUMMARY OF INVENTION

One or more embodiments of the present invention are directed to a servo press capable of preventing a step-out phenomenon from occurring and of realizing an improvement of takt time, as well as to provide a control method and a recording medium recording a program.

Embodiment (1)

One or more embodiments of the invention provide a servo press including: a slider disposed at a press casing and configured to make a linear reciprocating motion; a pulse motor configured to drive the slider in a linear reciprocating manner; an encoder disposed at the pulse motor; a slider position detection unit configured to detect a number of pulses based on an output signal from the encoder to obtain position information; a setting unit configured to set a pulse condition corresponding to an operating condition and an optimal deviation threshold based on a workpiece to be processed and the operating condition; a command pulse output unit configured to output a command pulse based on the operating condition that has been set; an encoder pulse counting unit configured to count the number of pulses output from the encoder; a command pulse counting unit configured to count a number of pulses output from the command pulse output unit; a difference calculation unit configured to calculate a difference between the number of pulses that has been counted by the command pulse counting unit and the number of pulses that has been counted by the encoder pulse counting unit; a pulse condition changing unit configured to change the pulse condition corresponding to the operating condition, according to a difference value between the deviation threshold and the difference calculated by the difference calculation unit; and a pulse motor control unit configured to control the pulse motor based on a position of the slider detected by the slider position detection unit, a position of the slider that has been set, and the pulse condition that has been changed, wherein the pulse condition changing unit changes the condition such that speed/acceleration of the pulse motor increases when the difference value is smaller than a predetermined range, and the speed/acceleration of the pulse motor decreases when the difference value is greater than the predetermined range.

The Embodiment (1) relates to a servo press based on closed loop control in which a closed loop is formed by the encoder disposed at the pulse motor. According to Embodiment (1), the output command pulse is counted based on the pulse condition corresponding to the operating condition and the optimal deviation threshold based on the workpiece to be processed and the operating condition. On the other hand, the number of pulses output from the encoder is counted. Next, the difference between the counted number of the command pulses and the counted number of the encoder pulses is calculated, and the condition is changed such that the speed/acceleration of the pulse motor increases when the difference value is smaller than the predetermined range, and the speed/acceleration of the pulse motor decreases when the difference value is greater than the predetermined range. Then, the pulse motor control unit controls the pulse motor based on the position of the slider (ram) detected by the slider (ram) position detection unit, the position of the slider (ram) that has been set, and the pulse condition that has been changed. Thus, as closed loop control is performed, it is possible to constantly monitor deviation of the number of pulses. Further, as the deviation may be grasped based on the number of pulses, it is possible to clearly grasp actual margin of safety in operation, and to set optimal speed/acceleration without causing a step-out phenomenon. Moreover, as the margin of safety in operation may be grasped, it is possible to automatically respond even when the operating condition changes such as processing to another workpiece, for example.

Embodiment (2)

One or more embodiments of the invention provide a servo press including: a slider disposed at a press casing and configured to make a linear reciprocating motion; a pulse motor configured to drive the slider in a linear reciprocating manner; an encoder disposed at the pulse motor; a speed feedback signal generating unit configured to generate a speed feedback signal by obtaining a positional signal based on an output signal from the encoder and differentiating the positional signal; a setting unit configured to set an operating condition including a condition of a position and a speed of the slider, a pulse condition corresponding to an operating condition, and an optimal deviation threshold based on a workpiece to be processed and the operating condition; a linear encoder disposed externally; a slider position detection unit configured to detect a position of the slider based on an output signal from the linear encoder; a command pulse output unit configured to output a command pulse based on the operating condition that has been set; an encoder pulse counting unit configured to count a number of pulses output from the encoder; a command pulse counting unit configured to count a number of pulses output from the command pulse output unit; a difference calculation unit configured to calculate a difference between the number of pulses that has been counted by the command pulse counting unit and the number of pulses that has been counted by the encoder pulse counting unit; a pulse condition changing unit configured to change the pulse condition corresponding to the operating condition, according to a difference value between the deviation threshold and the difference calculated by the difference calculation unit; and a pulse motor control unit configured to control the pulse motor based on the position of the slider detected by the slider position detection unit, a position of the slider that has been set, the pulse condition that has been changed, and the speed feedback signal generated by the speed feedback signal generating unit, wherein the pulse condition changing unit changes the condition such that speed/acceleration of the pulse motor increases when the difference value is smaller than a predetermined range, and the speed/acceleration of the pulse motor decreases when the difference value is greater than the predetermined range.

The Embodiment (2) relates to a servo press based on full-closed loop control in which the positional signal is obtained based on the output signal from the encoder, the signal is differentiated to generate the speed feedback signal, and the position of the slider (ram) is detected by the signal output from the linear encoder disposed externally. According to Embodiment (2), the output command pulse is counted based on the pulse condition corresponding to the operating condition and the optimal deviation threshold based on the workpiece to be processed and the operating condition. On the other hand, the number of pulses output from the encoder is counted. Next, the difference between the counted number of the command pulses and the counted number of the encoder pulses is calculated, and the condition is changed such that the speed/acceleration of the pulse motor increases when the difference value is smaller than the predetermined range, and the speed/acceleration of the pulse motor decreases when the difference value is greater than the predetermined range. Then, the pulse motor control unit controls the pulse motor based on the position of the slider detected by the slider (ram) position detection unit, the position of the slider (ram) that has been set, the pulse condition that has been changed, and the speed feedback signal generated by the speed feedback signal generating unit. Thus, as closed loop control is performed, it is possible to constantly monitor deviation of the number of pulses. Further, as the deviation may be grasped based on the number of pulses, it is possible to clearly grasp actual margin of safety in operation, and to set optimal speed/acceleration without causing a step-out phenomenon. Moreover, as the margin of safety in operation may be grasped, it is possible to automatically respond even when the operating condition changes such as processing to another workpiece, for example. In addition, as the position of the slider (ram) is controlled based on the value of the linear encoder disposed externally, it is possible to perform highly accurate processing.

Embodiment (3)

One or more embodiments of the invention provide a control unit for a servo press including: a slider disposed at a press casing and configured to make a linear reciprocating motion; a pulse motor configured to drive the slider in a linear reciprocating manner; an encoder disposed at the pulse motor; a slider position detection unit configured to detect a number of pulses based on an output signal from the encoder to obtain position information; a setting unit configured to set a pulse condition corresponding to an operating condition and an optimal deviation threshold based on a workpiece to be processed and the operating condition; a command pulse output unit configured to output a command pulse based on the operating condition that has been set; an encoder pulse counting unit; a command pulse counting unit; a difference calculation unit; a pulse condition changing unit; and a pulse motor control unit, the unit including: a first step of, by the encoder pulse counting unit, counting the number of pulses output from the encoder; a second step of, by the command pulse counting unit, counting a number of pulses output from the command pulse output unit; a third step of, by the difference calculation unit, calculating a difference between the number of pulses that has been counted by the command pulse counting unit and the number of pulses that has been counted by the encoder pulse counting unit; a fourth step of, by the pulse condition changing unit, changing the condition such that speed/acceleration of the pulse motor increases when a difference value between the deviation threshold and the difference calculated by the difference calculation unit is smaller than a predetermined range, and the speed/acceleration of the pulse motor decreases when the difference value is greater than the predetermined range; and a fifth step of, by the pulse motor control unit, controlling the pulse motor based on a position of the slider detected by the slider position detection unit, a position of the slider that has been set, and the pulse condition that has been changed.

The Embodiment (3) relates to a servo press based on closed loop control in which a closed loop is formed by the encoder disposed at the pulse motor. According to Embodiment (3), the output command pulse is counted based on the pulse condition corresponding to the operating condition and the optimal deviation threshold based on the workpiece to be processed and the operating condition. On the other hand, the number of pulses output from the encoder is counted. Next, the difference between the counted number of the command pulses and the counted number of the encoder pulses is calculated, and the condition is changed such that the speed/acceleration of the pulse motor increases when the difference value is smaller than the predetermined range, and the speed/acceleration of the pulse motor decreases when the difference value is greater than the predetermined range. Then, the pulse motor control unit controls the pulse motor based on the position of the slider (ram) detected by the slider (ram) position detection unit, the position of the slider (ram) that has been set, and the pulse condition that has been changed. Thus, as closed loop control is performed, it is possible to constantly monitor deviation of the number of pulses. Further, as the deviation may be grasped based on the number of pulses, it is possible to clearly grasp actual margin of safety in operation, and to set optimal speed/acceleration without causing a step-out phenomenon. Moreover, as the margin of safety in operation may be grasped, it is possible to automatically respond even when the operating condition changes such as processing to another workpiece, for example.

Embodiment (4)

One or more embodiments of the invention provide a control unit for a servo press including: a slider disposed at a press casing and configured to make a linear reciprocating motion; a pulse motor configured to drive the slider in a linear reciprocating manner; an encoder disposed at the pulse motor; a speed feedback signal generating unit configured to generate a speed feedback signal by obtaining a positional signal based on an output signal from the encoder and differentiating the positional signal; a setting unit configured to set an operating condition including a condition of a position and a speed of the slider, a pulse condition corresponding to an operating condition, and an optimal deviation threshold based on a workpiece to be processed and the operating condition; a linear encoder disposed externally; a slider position detection unit configured to detect a position of the slider based on an output signal from the linear encoder; a command pulse output unit; an encoder pulse counting unit; a command pulse counting unit; a difference calculation unit; a pulse condition changing unit; and a pulse motor control unit, the unit including: a first step of, by the encoder pulse counting unit, counting a number of pulses output from the encoder; a second step of, by the command pulse counting unit, counting a number of pulses output from the command pulse output unit; a third step of, by the difference calculation unit, calculating a difference between the number of pulses that has been counted by the command pulse counting unit and the number of pulses that has been counted by the encoder pulse counting unit; a fourth step of, by the pulse condition changing unit, changing the condition such that speed/acceleration of the pulse motor increases when a difference value between the deviation threshold and the difference calculated by the difference calculation unit is smaller than a predetermined range, and the speed/acceleration of the pulse motor decreases when the difference value is greater than the predetermined range; and a fifth step of, by the pulse motor control unit, controlling the pulse motor based on a position of the slider detected by the slider position detection unit, a position of the slider that has been set, the pulse condition that has been changed, and the speed feedback signal generated by the speed feedback signal generating unit.

The Embodiment (4) relates to a servo press based on full-closed loop control in which the positional signal is obtained based on the output signal from the encoder, the signal is differentiated to generate the speed feedback signal, and the position of the slider (ram) is detected by the signal output from the linear encoder disposed externally. According to Embodiment (4), the output command pulse is counted based on the pulse condition corresponding to the operating condition and the optimal deviation threshold based on the workpiece to be processed and the operating condition. On the other hand, the number of pulses output from the encoder is counted. Next, the difference between the counted number of the command pulses and the counted number of the encoder pulses is calculated, and the condition is changed such that the speed/acceleration of the pulse motor increases when the difference value is smaller than the predetermined range, and the speed/acceleration of the pulse motor decreases when the difference value is greater than the predetermined range. Then, the pulse motor control unit controls the pulse motor based on the position of the slider detected by the slider (ram) position detection unit, the position of the slider (ram) that has been set, the pulse condition that has been changed, and the speed feedback signal generated by the speed feedback signal generating unit. Thus, as closed loop control is performed, it is possible to constantly monitor deviation of the number of pulses. Further, as the deviation may be grasped based on the number of pulses, it is possible to clearly grasp actual margin of safety in operation, and to set optimal speed/acceleration without causing a step-out phenomenon. Moreover, as the margin of safety in operation may be grasped, it is possible to automatically respond even when the operating condition changes such as processing to another workpiece, for example. In addition, as the position of the slider (ram) is controlled based on the value of the linear encoder disposed externally, it is possible to perform highly accurate processing.

Embodiment (5)

One or more embodiments of the invention provide a recording medium recording a program for causing a computer to execute a control unit for a servo press including: a slider disposed at a press casing and configured to make a linear reciprocating motion; a pulse motor configured to drive the slider in a linear reciprocating manner; an encoder disposed at the pulse motor; a slider position detection unit configured to detect a number of pulses based on an output signal from the encoder to obtain position information; a setting unit configured to set a pulse condition corresponding to an operating condition and an optimal deviation threshold based on a workpiece to be processed and the operating condition; a command pulse output unit configured to output a command pulse based on the operating condition that has been set; an encoder pulse counting unit; a difference calculation unit; a pulse condition changing unit; and a pulse motor control unit, the program causing the computer to execute the unit including: a first step of, by the encoder pulse counting unit, counting the number of pulses output from the encoder; a second step of, by the command pulse counting unit, counting a number of pulses output from the command pulse output unit; a third step of, by the difference calculation unit, calculating a difference between the number of pulses that has been counted by the command pulse counting unit and the number of pulses that has been counted by the encoder pulse counting unit; a fourth step of, by the pulse condition changing unit, changing the condition such that speed/acceleration of the pulse motor increases when a difference value between the deviation threshold and the difference calculated by the difference calculation unit is smaller than a predetermined range, and the speed/acceleration of the pulse motor decreases when the difference value is greater than the predetermined range; and a fifth step of, by the pulse motor control unit, controlling the pulse motor based on a position of the slider detected by the slider position detection unit, a position of the slider that has been set, and the pulse condition that has been changed.

The Embodiment (5) relates to a servo press based on closed loop control in which a closed loop is formed by the encoder disposed at the pulse motor. According to Embodiment (5), the output command pulse is counted based on the pulse condition corresponding to the operating condition and the optimal deviation threshold based on the workpiece to be processed and the operating condition. On the other hand, the number of pulses output from the encoder is counted. Next, the difference between the counted number of the command pulses and the counted number of the encoder pulses is calculated, and the condition is changed such that the speed/acceleration of the pulse motor increases when the difference value is smaller than the predetermined range, and the speed/acceleration of the pulse motor decreases when the difference value is greater than the predetermined range. Then, the pulse motor control unit controls the pulse motor based on the position of the slider (ram) detected by the slider (ram) position detection unit, the position of the slider (ram) that has been set, and the pulse condition that has been changed. Thus, as closed loop control is performed, it is possible to constantly monitor deviation of the number of pulses. Further, as the deviation may be grasped based on the number of pulses, it is possible to clearly grasp actual margin of safety in operation, and to set optimal speed/acceleration without causing a step-out phenomenon. Moreover, as the margin of safety in operation may be grasped, it is possible to automatically respond even when the operating condition changes such as processing to another workpiece, for example.

Embodiment (6)

One or more embodiments of the invention provide a recording medium recording a program for causing a computer to execute a control unit for a servo press including: a slider disposed at a press casing and configured to make a linear reciprocating motion; a pulse motor configured to drive the slider in a linear reciprocating manner; an encoder disposed at the pulse motor; a speed feedback signal generating unit configured to generate a speed feedback signal by obtaining a positional signal based on an output signal from the encoder and differentiating the positional signal; a setting unit configured to set an operating condition including a condition of a position and a speed of the slider, a pulse condition corresponding to an operating condition, and an optimal deviation threshold based on a workpiece to be processed and the operating condition; a linear encoder disposed externally; a slider position detection unit configured to detect a position of the slider based on an output signal from the linear encoder; a command pulse output unit; an encoder pulse counting unit; a command pulse counting unit; a difference calculation unit; a pulse condition changing unit; and a pulse motor control unit, the program causing the computer to execute the unit including: a first step of, by the encoder pulse counting unit, counting a number of pulses output from the encoder; a second step of, by the command pulse counting unit, counting a number of pulses output from the command pulse output unit; a third step of, by the difference calculation unit, calculating a difference between the number of pulses that has been counted by the command pulse counting unit and the number of pulses that has been counted by the encoder pulse counting unit; a fourth step of, by the pulse condition changing unit, changing the condition such that speed/acceleration of the pulse motor increases when a difference value between the deviation threshold and the difference calculated by the difference calculation unit is smaller than a predetermined range, and the speed/acceleration of the pulse motor decreases when the difference value is greater than the predetermined range; and a fifth step of, by the pulse motor control unit, controlling the pulse motor based on a position of the slider detected by the slider position detection unit, a position of the slider that has been set, the pulse condition that has been changed, and the speed feedback signal generated by the speed feedback signal generating unit.

The Embodiment (6) relates to a servo press based on full-closed loop control in which the positional signal is obtained based on the output signal from the encoder, the signal is differentiated to generate the speed feedback signal, and the position of the slider (ram) is detected by the signal output from the linear encoder disposed externally. According to Embodiment (6), the output command pulse is counted based on the pulse condition corresponding to the operating condition and the optimal deviation threshold based on the workpiece to be processed and the operating condition. On the other hand, the number of pulses output from the encoder is counted. Next, the difference between the counted number of the command pulses and the counted number of the encoder pulses is calculated, and the condition is changed such that the speed/acceleration of the pulse motor increases when the difference value is smaller than the predetermined range, and the speed/acceleration of the pulse motor decreases when the difference value is greater than the predetermined range. Then, the pulse motor control unit controls the pulse motor based on the position of the slider detected by the slider (ram) position detection unit, the position of the slider (ram) that has been set, the pulse condition that has been changed, and the speed feedback signal generated by the speed feedback signal generating unit. Thus, as closed loop control is performed, it is possible to constantly monitor deviation of the number of pulses.

Further, as the deviation may be grasped based on the number of pulses, it is possible to clearly grasp actual margin of safety in operation, and to set optimal speed/acceleration without causing a step-out phenomenon. Moreover, as the margin of safety in operation may be grasped, it is possible to automatically respond even when the operating condition changes such as processing to another workpiece, for example. In addition, as the position of the slider (ram) is controlled based on the value of the linear encoder disposed externally, it is possible to perform highly accurate processing.

According to one or more embodiments of the present invention, as closed loop control is performed, it is possible to constantly monitor deviation of the number of pulses. Further, as the deviation may be grasped based on the number of pulses, it is possible to provide an effect of clearly grasping actual margin of safety in operation, and setting optimal speed/acceleration without causing a step-out phenomenon.

Moreover, as the margin of safety in operation may be grasped, it is possible to provide an effect of automatically responding even when the operating condition changes such as processing to another workpiece, for example. Furthermore, as the position of the slider (ram) is controlled based on the value of the linear encoder disposed externally when used in full-closed loop control, it is possible to provide an effect of performing highly accurate processing, in addition to the above effects.

DETAILED DESCRIPTION

Hereinafter, an embodiment of the present invention will be described in detail with reference to the drawings.

It should be noted that components in this embodiment may be replaced by existing components as appropriate, and variations including combinations with other existing components may also be possible. Therefore, the description of this embodiment may not limit the scope of the invention defined by the claims.

First Embodiment

Hereinafter, the embodiment of the present invention will be described with reference to FIG. 1 through FIG. 4.

Figure 1:
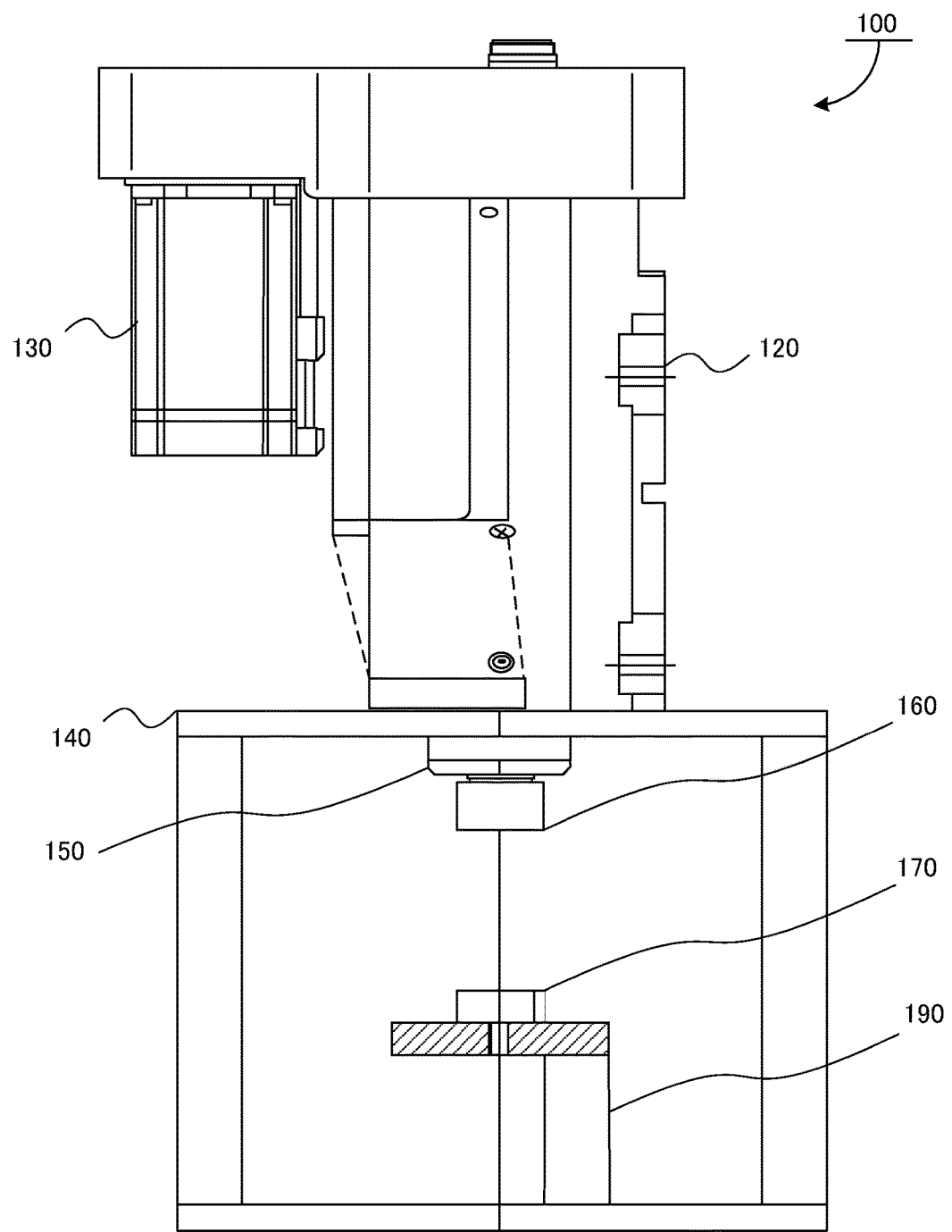
FIG. 1 is a side view of a servo press according to one or more embodiments of the present invention.

As illustrated in FIG. 1, a servo press 100 according to this embodiment is configured by a press main body 120, a pulse motor 130, a table 140 on which the press main body 120 is placed, a ram 150 moving up and down with respect to the press main body 120, a shank 160, a workpiece 170, and a workpiece attachment base 190 for attaching a workpiece.

The servo press 100 is disposed with a frame that is not shown, and the table 140 is disposed under the frame. The workpiece attachment base 190 is disposed horizontally within the table 140, and the workpiece 170 is attached to an upper surface of the workpiece attachment base 190. Further, the ram 150 and the shank 160 disposed at a tip portion of the ram 150 are inserted through the press main body 120 into the table 140, and move up and down.

The ram 150 is connected with the pulse motor 130 via a power conversion member and a rotation transmission member that are not shown, and driven by the pulse motor 130. Further, the pulse motor 130 is connected to a controller via a driver that will be later described. The ram 150 driven by the pulse motor 130 is controlled based on a control pattern that has been input to the controller or a control pattern automatically set based on a processing condition that has been input.

<Overall Configuration and Control>

An overall configuration and control of the servo press according to this embodiment will be described with reference to FIG. 2 and FIG. 3.

Figure 2:
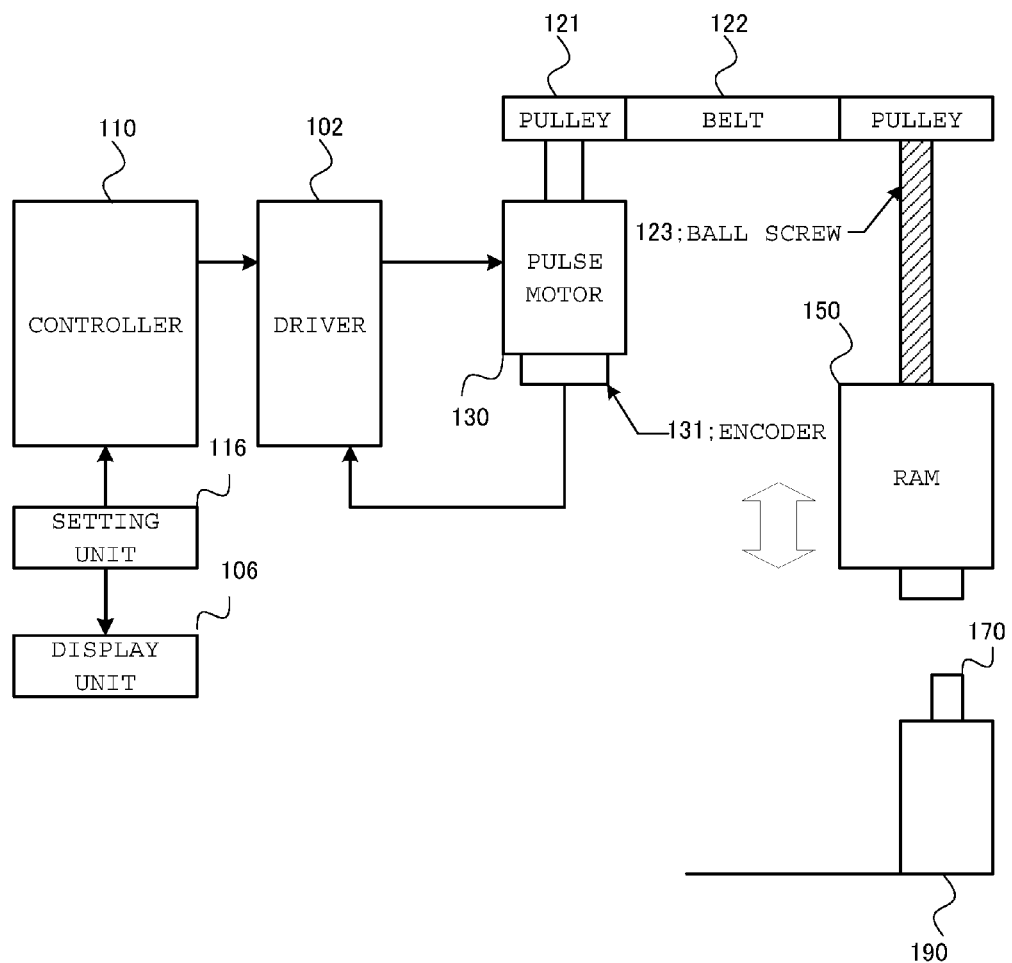
FIG. 2 is overall illustration of a structure and control of the servo press according to one or more embodiments of the present invention.

As illustrated in FIG. 2, the servo press 100 according to this embodiment is configured by a the controller 110, a driver 102, a setting unit 116, a display unit 106, a pulley 121, a belt 122, a ball screw 123, the pulse motor 130, an encoder 131, the rain 150, the workpiece 170, and the workpiece attachment base 190.

Above the frame, the pulse motor 130 as a power source of the servo press 100, and the pulley 121 as the rotation transmission member for converting a rotative force of the pulse motor 130 into reciprocating motion are attached. The pulse motor 130 is disposed with the encoder 131 for detecting a position, and rotating speed of the pulse motor 130 is controlled by the controller 110 controlling current. The rotative force of the pulse motor 130 is transmitted to the ball screw 123 by the belt 122 as the rotation transmission member.

Further, the rotation transmission member is exemplified by, but not limited to, the pulley 121, and may be a chain or a gear. Moreover, the rotation transmission member may be directly coupled to an output axis of the pulse motor 130. Furthermore, the power conversion device is exemplified by, but not limited to, the ball screw 123, and may be a screw mechanism, a combination of a worm gear and a worm wheel, or a combination of a pinion gear and a rack. To a lower end of the ball screw 123, the ram 150 that moves up and down at a position facing against the workpiece attachment base 190 is attached, and press working is performed to an object to be processed by the ram 150 moving down from an uppermost position (start position) to a lowermost position (stop position). Then, the ram 150 moves up to the uppermost position (start position), after the ram 150 reaches the lowermost position (stop position) and processing to the object to be processed ends. The encoder 131 is attached to a predetermined position of the pulse motor 130.

In press working, data, such as operating speed of the ram 150, a switching position of the speed, lowermost position (stop position), time for pressurization, and deviation threshold or the like relating to a difference value of a number of pulses as control conditions, is set via the setting unit 116.

The set data is displayed in the display unit 106. The display unit 106 is configured by a setting switch and unit such as a liquid crystal display screen or a CRT. Further, the display unit 106 is disposed with switches for selecting an operational mode such as operation and condition setting, and for instructing operation such as automatic operation or manual operation, for example.

Then, the control data input through the display unit 106 is taken and recorded in a memory unit that is later described, and the ram 150 is controlled according to a previously installed procedures. The controller 110 is configured as a commonly-used computer or the like having functions such as data recording, computation, data display, and input and output of data.

<Functional Blocks of Servo Press>

Figure 3:
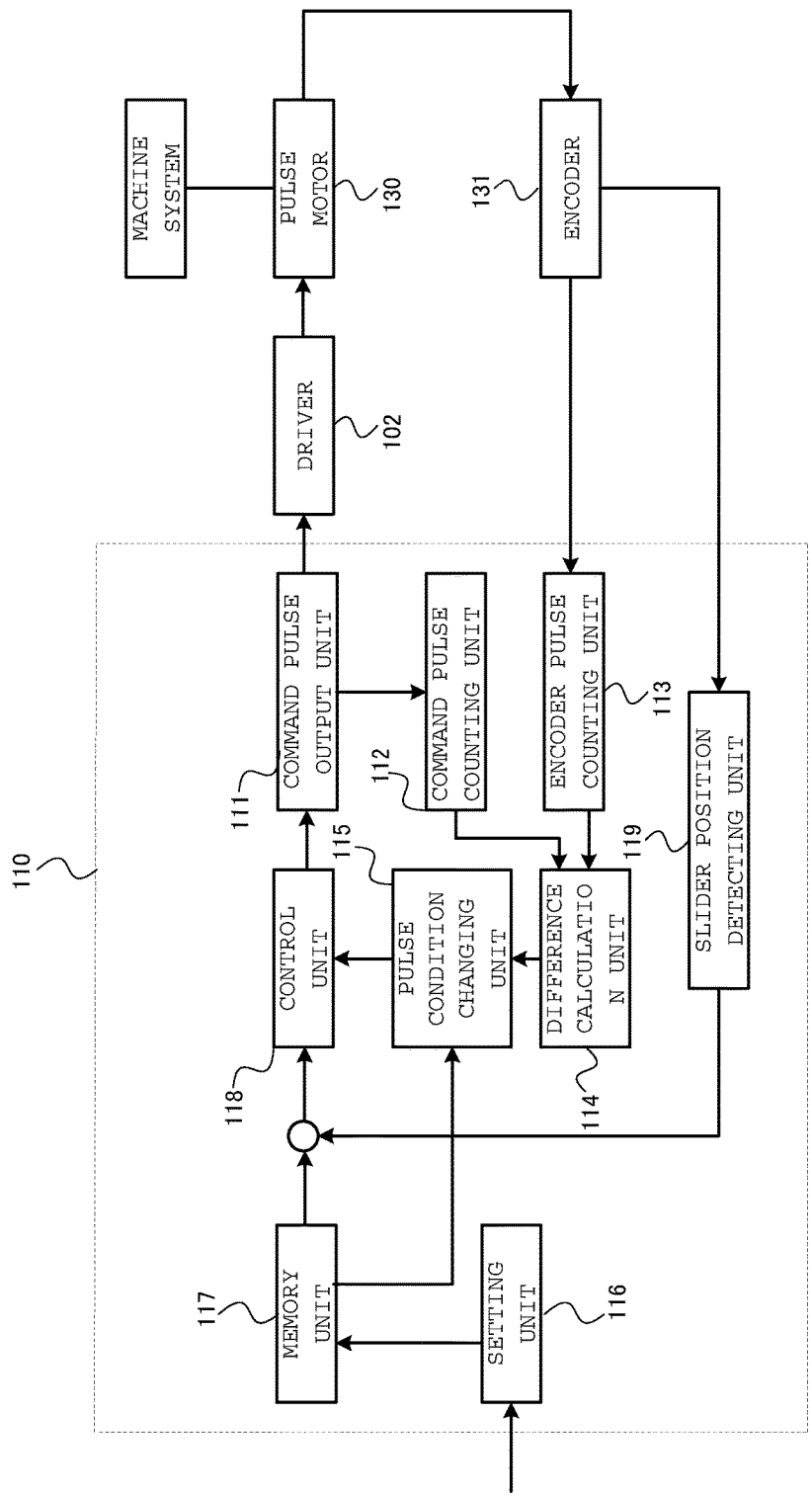
FIG. 3 is a functional block diagram of the servo press according to one or more embodiments of the present invention.

As illustrated in FIG. 3, the servo press according to this embodiment 100 is configured by the controller 110, a command pulse output unit 111 that constitutes the controller 110, a command pulse counting unit 112, an encoder pulse counting unit 113, a difference calculation unit 114, a pulse condition changing unit 115, the setting unit 116, a memory unit 117, a control unit 118, a slider position detecting unit 119, the driver 102, the pulse motor 130, and the encoder 131.

The command pulse output unit 111 outputs a command pulse to the driver 102 in response to an instruction from the control unit 118, based on an operating condition that has been set. The command pulse counting unit 112 counts a number of pulses output from the command pulse output unit 111. The encoder pulse counting unit 113 counts a number of pulses output from the encoder 131.

The difference calculation unit 114 calculates a difference between the number of pulses counted by the command pulse counting unit 112 and the number of pulses counted by the encoder pulse counting unit 113. The pulse condition changing unit 115 changes a pulse condition corresponding to the operating condition according to a difference value between a deviation threshold that has been previously set by the setting unit 116 and stored in the memory unit 117 and a value calculated by the difference calculation unit 114.

Specifically, the pulse condition changing unit 115 changes the condition such that speed/acceleration of the pulse motor increases when the difference value is smaller than a predetermined range, and the speed/acceleration of the pulse motor decreases when the difference value is greater than the predetermined range.

The control unit 118 controls the pulse motor based on a position of the slider that has been detected, a position of the slider that has been set, and the pulse condition that has been changed. The slider position detecting unit detects a number of pulses based on an output signal from the encoder to obtain position information.

<Control Processing of Servo Press>

Figure 4:
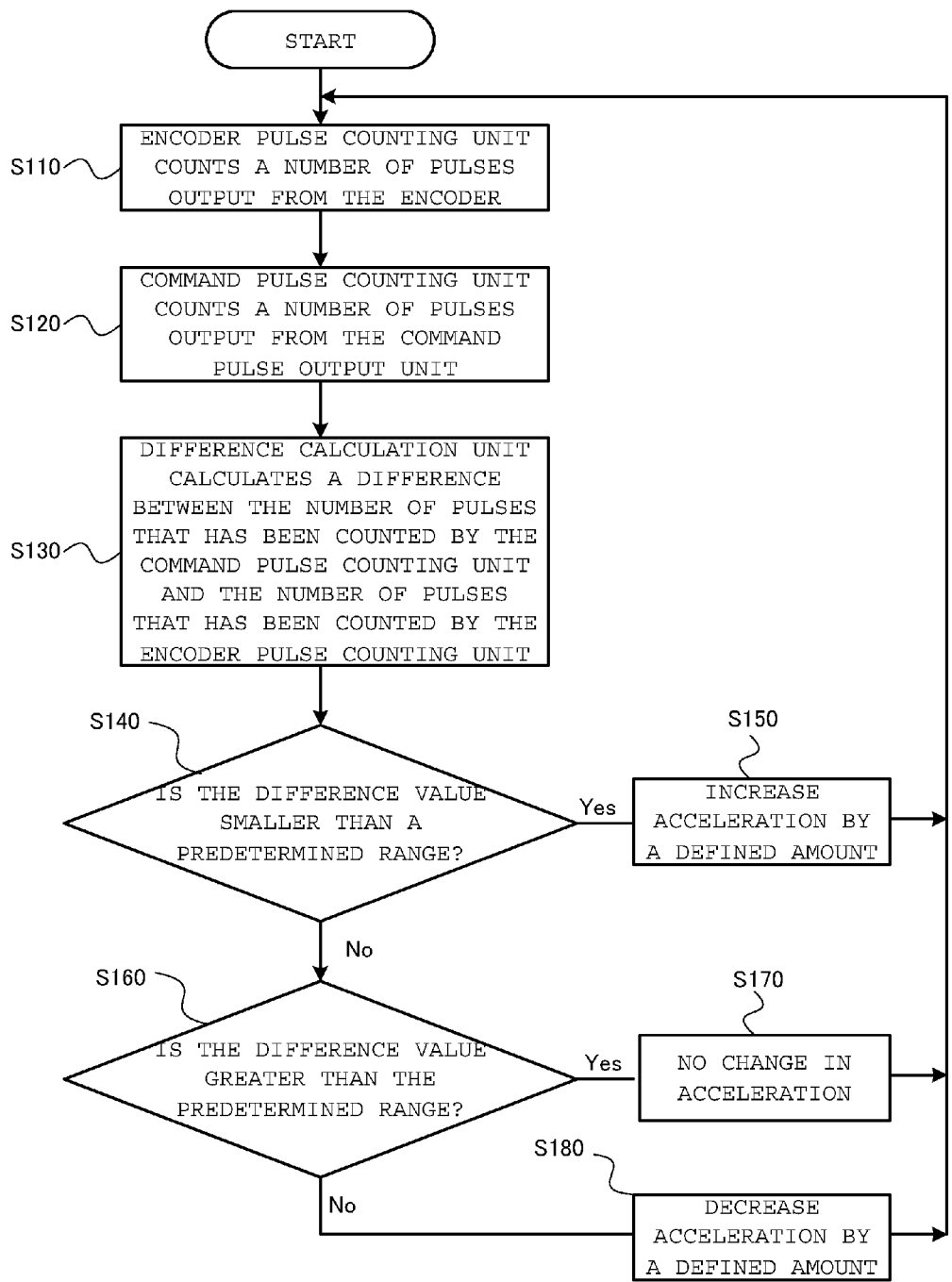
FIG. 4 is a flowchart of control of the servo press according to one or more embodiments of the present invention.

Control processing of the servo press according to this embodiment will be described with reference to FIG. 4.

The encoder pulse counting unit 113 counts a number of pulses output from the encoder (Step S110). The command pulse counting unit 112 counts a number of pulses output from the command pulse output unit 111 (Step S120).

The difference calculation unit 114 calculates a difference between the number of pulses that has been counted by the command pulse counting unit 112 and the number of pulses that has been counted by the encoder pulse counting unit 113 (Step S130).

The pulse condition changing unit 115 changes the pulse condition such that speed/acceleration of the pulse motor increases when a difference value between the difference calculated by the difference calculation unit 114 and the deviation threshold is smaller than a predetermined range (Step S140 "Yes" in) (Step S150).

Then, if the difference value is not smaller than the predetermined range ("No" in Step S140), it is then determined whether or not the difference value is greater than the predetermined range (Step S160). If the difference value is greater than the predetermined range at this time ("Yes" in Step S160), the pulse condition changing unit 115 changes the pulse condition such that the speed/acceleration of the pulse motor increases (Step S180). Further, if the difference value is not greater than the predetermined range in Step S160, the pulse condition is unchanged (Step S170). Then, the pulse motor is controlled based on the detected position of the slider, the position of the slider that has been set, and the pulse condition that has been changed.

As described above, according to this embodiment, as closed loop control is performed, it is possible to constantly monitor deviation of the number of pulses. Further, as the deviation may be grasped based on the number of pulses, it is possible to clearly grasp actual margin of safety in operation, and to set optimal speed/acceleration without causing a step-out phenomenon. Moreover, as the margin of safety in operation may be grasped, it is possible to automatically respond even when the operating condition changes such as processing to another workpiece, for example.

Second Embodiment

Hereinafter, the embodiment of the present invention will be described with reference to FIG. 5 through FIG. 8.

Figure 5:
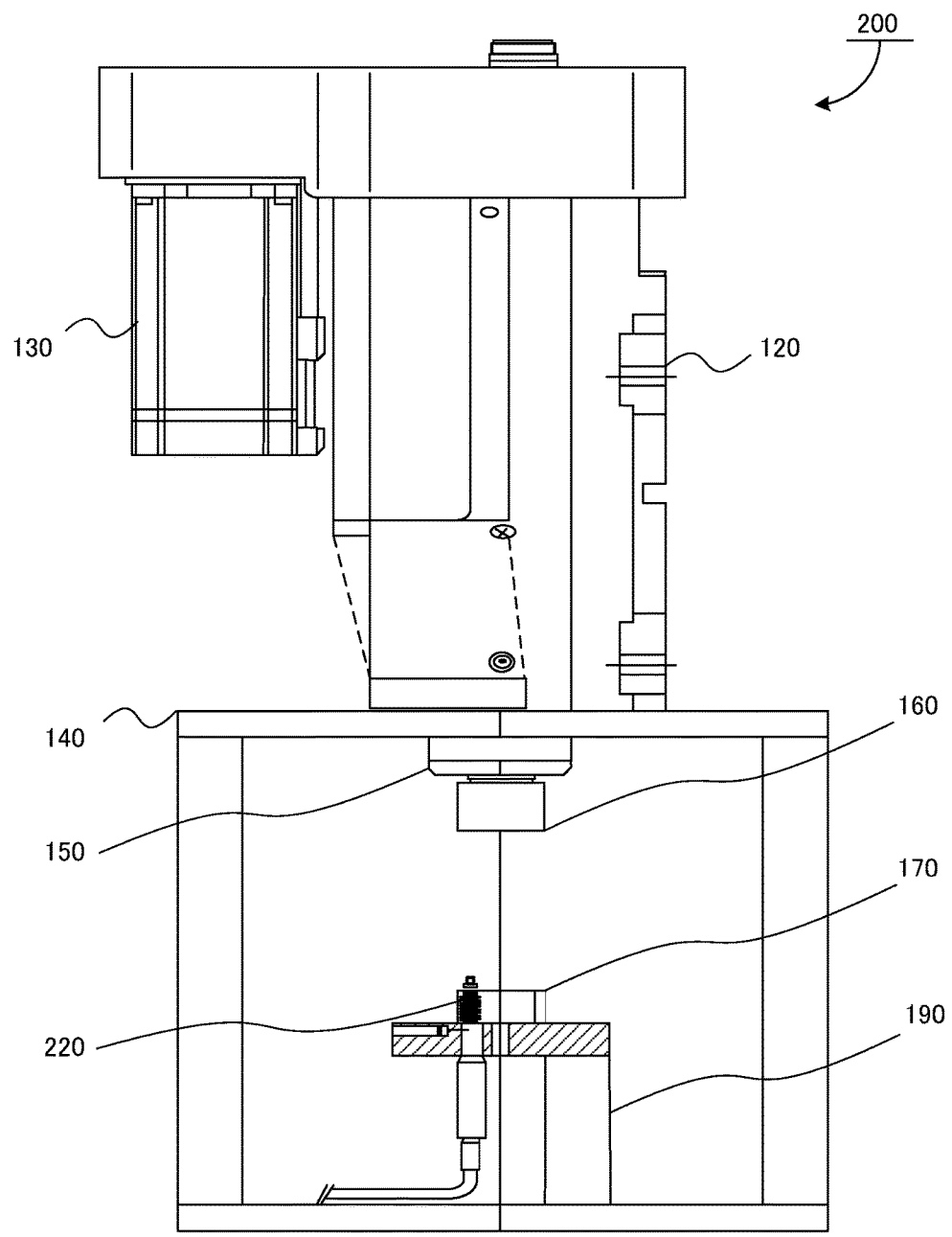
FIG. 5 is a side view of a servo press according to one or more embodiments of the present invention.

As illustrated in FIG. 5, a servo press 100 according to this embodiment is configured by a press main body 120, a pulse motor 130, a table 140 on which the press main body 120 is placed, a ram 150 moving up and down with respect to the press main body 120, a shank 160, a workpiece 170, a workpiece attachment base 190 for attaching a workpiece, and a linear encoder 220.

<Overall Configuration and Control>

An overall configuration and control of the servo press according to this embodiment will be described with reference to FIG. 6 and FIG. 7.

Figure 6:
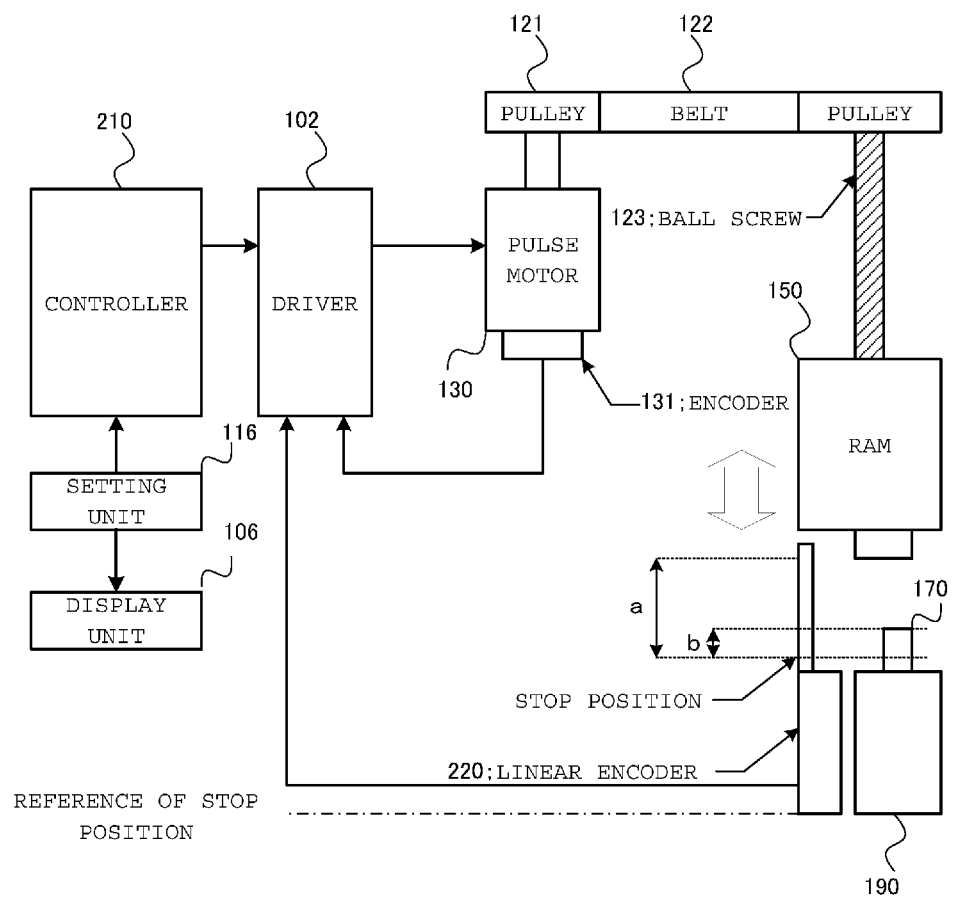
FIG. 6 is overall illustration of a structure and control of the servo press according to one or more embodiments of the present invention.

As illustrated in FIG. 6, the servo press according to this embodiment 100 according to this embodiment is configured by a controller 210, a driver 102, a setting unit 116, a display unit 106, a pulley 121, a belt 122, a ball screw 123, the pulse motor 130, an encoder 131, the ram 150, the workpiece 170, and the workpiece attachment base 190, and the linear encoder 220. Components with like reference numerals as those in the first embodiment have the same functions, and detailed descriptions for such components shall be omitted.

The linear encoder 220 is disposed at the stop position of the ram 150, for example. Specifically, a position to attach the linear encoder 220 with respect to a direction of movement of the ram 150 is set based on a reference stop position of the ram 150. Accordingly, as the position to attach the linear encoder 220 with respect to a direction of movement of the ram is set based on a reference position of the workpiece 170, accuracy in the processing position to the workpiece 170, and accuracy in the processing of the workpiece 170 are improved.

Here, detection of a position of the ram 150 using the linear encoder 220 is performed using the linear encoder 220 disposed at the stop position of the ram 150 on the workpiece attachment base 190 such that an axial direction is parallel to an up and down direction of the ram 150, and a detection head that is not shown and disposed at a position facing against the linear encoder 220. In other words, by the detection head moving up and down with respect to the linear encoder 220 that is fixed along with up and down movement of the ram 150, the position of the ram 150 is detected by a sensor built within the detection head as a height based on the reference stop position of the ram 150.

<Functional Blocks of Servo Press>

Figure 7:
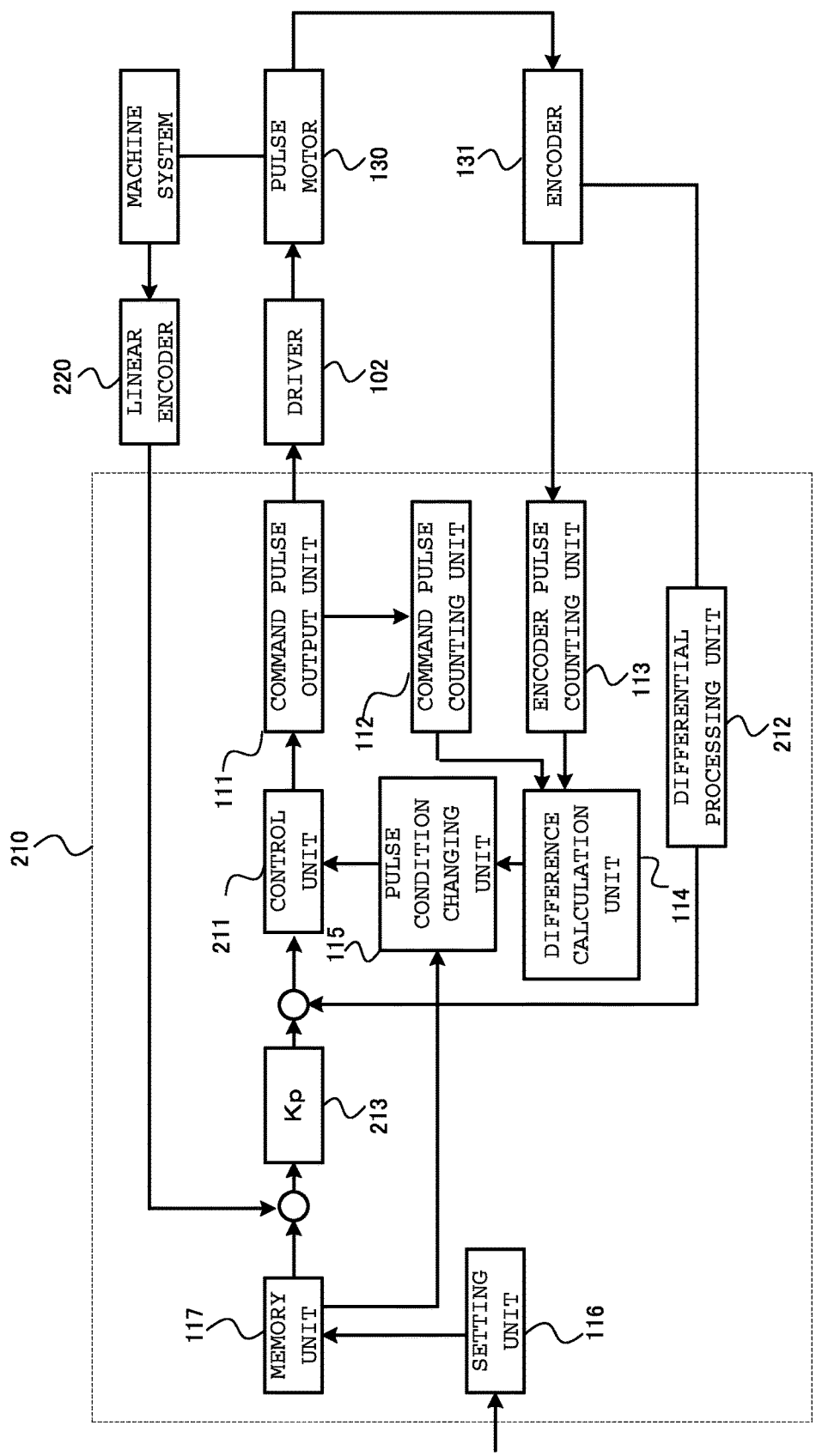
FIG. 7 is a functional block diagram of the servo press according to one or more embodiments of the present invention.

As illustrated in FIG. 7, the servo press according to this embodiment 100 is configured by a controller 210, a command pulse output unit 111 that constitutes the controller 210, a command pulse counting unit 112, an encoder pulse counting unit 113, a difference calculation unit 114, a pulse condition changing unit 115, the setting unit 116, a memory unit 117, a control unit 211, a differential processing unit 212, a position control gain Kp (slider position detecting unit) 213, the driver 102, the pulse motor 130, the encoder 131, and the linear encoder 220. Components with like reference numerals as those in the first embodiment have the same functions, and detailed descriptions for such components shall be omitted.

The differential processing unit 212 generates a speed feedback signal by differentiating a positional signal from the encoder 131. The position control gain Kp (slider position detecting unit) 213 is a gain factor for converting deviation between a position command and a load positional signal obtained from the linear encoder 220 into a speed command.

The control unit 211 controls the pulse motor based on a position of the slider obtained from the linear encoder 220, a position of the slider that has been set (position command), the pulse condition that has been changed, and the speed feedback signal.

<Control Processing of Servo Press>

Figure 8:
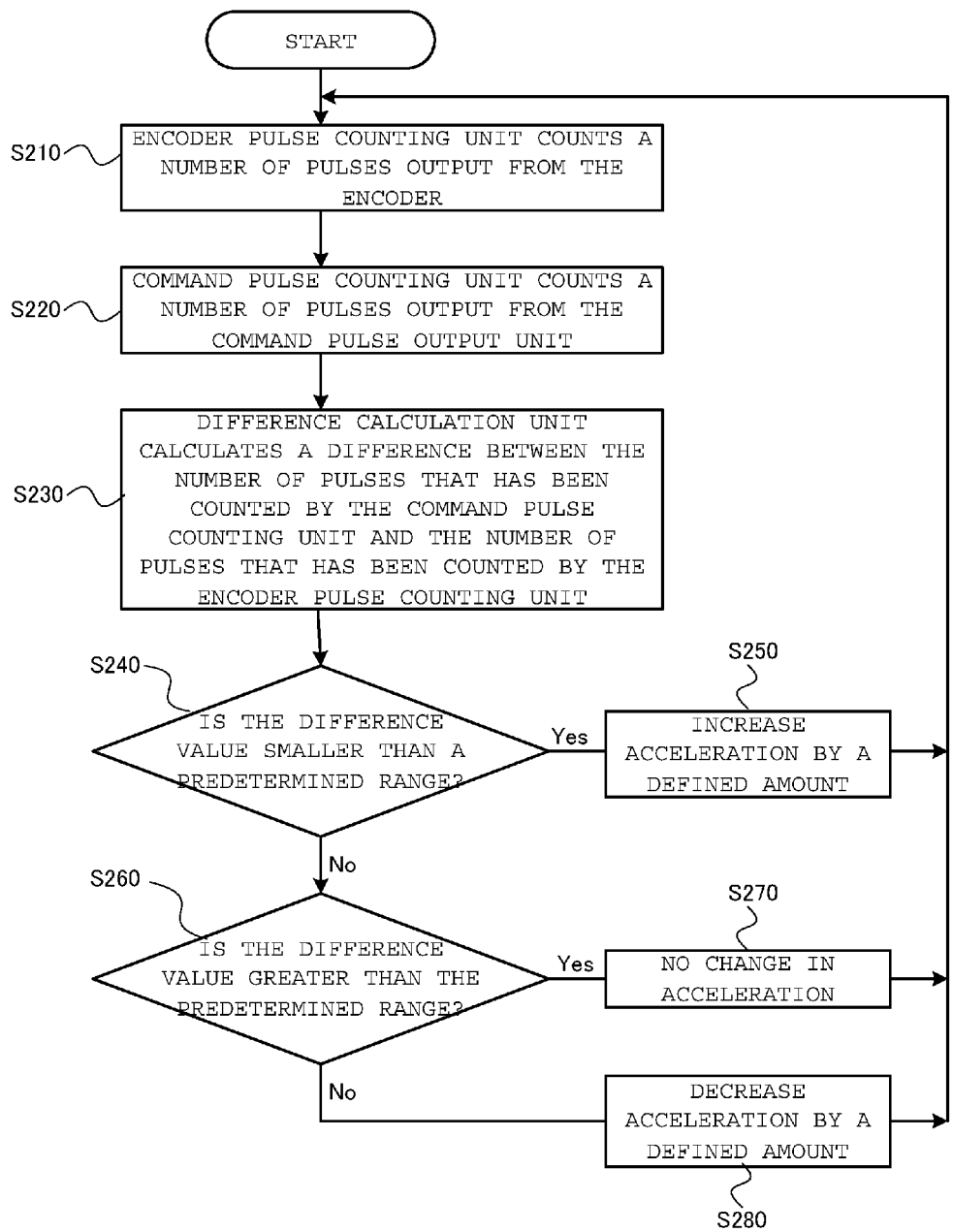
FIG. 8 is a flowchart of control of the servo press according to one or more embodiments of the present invention.

Control processing of the servo press according to this embodiment will be described with reference to FIG. 8.

The encoder pulse counting unit 113 counts a number of pulses output from the encoder (Step S210). The command pulse counting unit 112 counts a number of pulses output from the command pulse output unit 111 (Step S220).

The difference calculation unit 114 calculates a difference between the number of pulses that has been counted by the command pulse counting unit 112 and the number of pulses that has been counted by the encoder pulse counting unit 113 (Step S230).

The pulse condition changing unit 115 changes the pulse condition such that speed/acceleration of the pulse motor increases when a difference value between the difference calculated by the difference calculation unit 114 and the deviation threshold is smaller than a predetermined range ("Yes" in Step S240) (Step S250).

Then, if the difference value is not smaller than the predetermined range ("No" in Step S240), it is then determined whether or not the difference value is greater than the predetermined range (Step S260). If the difference value is greater than the predetermined range at this time ("Yes" in Step S260), the pulse condition changing unit 115 changes the pulse condition such that the speed/acceleration of the pulse motor increases (Step S280). Further, if the difference value is not greater than the predetermined range in Step S260, the pulse condition is unchanged (Step S270). Then, the pulse motor is controlled based on the detected position of the slider, the position of the slider that has been set, and the pulse condition that has been changed.

As described above, according to this embodiment, as closed loop control is performed, it is possible to constantly monitor deviation of the number of pulses. Further, as the deviation may be grasped based on the number of pulses, it is possible to clearly grasp actual margin of safety in operation, and to set optimal speed/acceleration without causing a step-out phenomenon. Moreover, as the margin of safety in operation may be grasped, it is possible to automatically respond even when the operating condition changes such as processing to another workpiece, for example. Furthermore, as the position of the slider (ram) is controlled based on the value of the linear encoder disposed externally when used in full-closed loop control, it is possible to perform highly accurate processing, in addition to the above effects.

It should be noted that it is possible to realize the servo press according to the present invention by recording the processing of the servo press described above in a medium that is readable by a computer system, and having the servo press read and execute the recorded in the medium. As used herein, examples of the computer system include an OS and hardware such as peripheral devices.

In a case in which WWW (World Wide Web) system is utilized, the examples of the "computer system" further include a web page providing environment (or display environment). Further, the program may be transmitted to other computer systems from the computer system having the program recorded in its recording device or the like, via a transmission medium, or a transmitted wave in the transmission medium. As used herein, the "transmission medium" that transmits the program refers to a medium having a function of transmitting information, examples of which including a network (communication network) such as the Internet and a communication line (communication wire) such as a telephone line.

Moreover, the program may realize a part of the functions described above. Furthermore, the program may be a so-called difference file (difference program) that may realize the functions described above in combination with a program that is already recorded in the computer system.

Thus, the embodiment of this invention has been described with the drawings, but specific configurations are not limited to the embodiment described above, and include various designs not departing from the scope of the invention.

REFERENCE SIGNS LIST

100: servo press (pulse motor system)
102: driver
106: display unit
110: controller (pulse motor system controller)
111: command pulse output unit (command pulse generator)
112: command pulse counting unit (command pulse counter)
113: encoder pulse counting unit (encoder pulse counter)
114: difference calculation unit (difference calculator)
115: pulse condition changing unit
116: setting unit
117: memory unit (non-transitory computer-readable recording medium)
118: control unit (pulse motor controller)
119: slider position detecting unit (slider position detector)
120: press main body
121: pulley
122: belt
123: ball screw 130: pulse motor
131: encoder
140: table
150: ram (slider)
160: shank
170: workpiece
190: workpiece attachment base
210: controller (pulse motor system controller)
211: control unit (pulse motor controller)
212: differential processing unit (speed feedback signal generator)
213: position control gain Kp (slider position detecting unit)
220: linear encoder

What is claimed is:

1. A pulse motor system comprising:
a slider that makes a linear reciprocating motion for a presswork to process a workpiece;
a pulse motor configured to drive the slider in a linear reciprocating manner;
an encoder disposed at the pulse motor;
a speed feedback signal generator that generates a speed feedback signal by obtaining a positional signal based on an output signal from the encoder and differentiating the positional signal;
a setting unit that sets an operating condition including a condition of a position and a speed of the slider, a pulse condition corresponding to the operating condition, and an optimal deviation threshold based on the workpiece to be processed and the operating condition;
a linear encoder disposed externally;
a slider position detector that detects a position of the slider based on an output signal from the linear encoder;
a command pulse generator that generates a command pulse based on the operating condition that has been set;
an encoder pulse counter that constantly counts a number of pulses output from the encoder;
a command pulse counter that counts a number of pulses generated by the command pulse generator;
a difference calculator that calculates a difference between the number of pulses that has been constantly counted by the command pulse counter and the number of pulses that has been counted, when the slider is making the linear reciprocating motion, by the encoder pulse counter;
a pulse condition changing unit that obtains a difference value between the deviation threshold and the difference calculated by the difference calculator, so as to change the pulse condition corresponding to the operating condition, according to the difference value between the deviation threshold and the difference calculated by the difference calculator; and
a pulse motor controller that controls the pulse motor at optimal speed and acceleration without causing a step-out phenomenon based on the position of the slider detected by the slider position detector, a position of the slider that has been set, the pulse condition that has been changed, and the speed feedback signal generated by the speed feedback signal generator, wherein
the pulse condition changing unit that obtains a difference value between the deviation threshold and the difference calculated by the difference calculator, so as to change the condition such that speed/acceleration of the pulse motor increases when the difference value is smaller than a predetermined range, and the speed/acceleration of the pulse motor decreases when the difference value is greater than the predetermined range.

2. A pulse motor system controller for a pulse motor system, the system including:
a slider that makes a linear reciprocating motion for a presswork to process a work piece;
a pulse motor configured to drive the slider in a linear reciprocating manner;
an encoder disposed at the pulse motor;
a speed feedback signal generator that generates a speed feedback signal by obtaining a positional signal based on an output signal from the encoder and differentiating the positional signal;
a setting unit that sets an operating condition including a condition of a position and a speed of the slider, a pulse condition corresponding to the operating condition, and an optimal deviation threshold based on the workpiece to be processed and the operating condition;
a linear encoder disposed externally;
a slider position detector that detects a position of the slider based on an output signal from the linear encoder;
a command pulse generator;
an encoder pulse counter;
a command pulse counter;
a difference calculator;
a pulse condition changing unit; and
a pulse motor controller,
wherein the pulse motor system controller performs:
a first step of, by the encoder pulse counter, constantly counting a number of pulses output from the encoder;
a second step of, by the command pulse counter, counting a number of pulses generated by the command pulse generator;
a third step of, by the difference calculator, calculating a difference between the number of pulses that has been constantly counted by the command pulse counter and the number of pulses that has been counted, when the slider is making the linear reciprocating motion, by the encoder pulse counter;
a fourth step of, by the pulse condition changing unit, changing the condition such that speed/acceleration of the pulse motor increases when a difference value between the deviation threshold and the difference calculated by the difference calculator is smaller than a predetermined range, and the speed/acceleration of the pulse motor decreases when the difference value is greater than the predetermined range, and setting optimal speed and acceleration without causing a step-out phenomenon; and
a fifth step of, by the pulse motor controller, controlling the pulse motor at the optimal speed and acceleration without causing the step-out phenomenon based on a position of the slider detected by the slider position detector, a position of the slider that has been set, the pulse condition that has been changed, and the speed feedback signal generated by the speed feedback signal generator.

3. A non-transitory computer-readable recording medium recording a program for causing a computer to execute a control method for a pulse motor system, the pulse motor system including:
a slider that makes a linear reciprocating motion for a presswork to process a workpiece;
a pulse motor configured to drive the slider in a linear reciprocating manner;

an encoder disposed at the pulse motor;

a speed feedback signal generator configured to generate a speed feedback signal by obtaining a positional signal based on an output signal from the encoder and differentiating the positional signal;

a setting unit that sets an operating condition including a condition of a position and a speed of the slider, a pulse condition corresponding to the operating condition, and an optimal deviation threshold based on the workpiece to be processed and the operating condition;

a linear encoder disposed externally;

a slider position detector that detects a position of the slider based on an output signal from the linear encoder;

a command pulse output unit;

an encoder pulse counter;

a command pulse counter;

a difference calculator;

a pulse condition changing unit; and a pulse motor controller, and wherein the pulse motor system is controlled to perform:

a first step of, by the encoder pulse counter, constantly counting a number of pulses output from the encoder;

a second step of, by the command pulse counter, counting a number of pulses generated by the command pulse generator;

a third step of, by the difference calculator, calculating a difference between the number of pulses that has been constantly counted by the command pulse counter and the number of pulses that has been counted, when the slider is making the linear reciprocating motion, by the encoder pulse counter;

a fourth step of, by the pulse condition changing unit, changing the condition such that speed/acceleration of the pulse motor increases when a difference value between the deviation threshold and the difference calculated by the difference calculator is smaller than a predetermined range, and the speed/acceleration of the pulse motor decreases when the difference value is greater than the predetermined range, and setting optimal speed and acceleration without causing a step-out phenomenon; and a fifth step of, by the pulse motor controller, controlling the pulse motor at the optimal speed and acceleration without causing the step-out phenomenon based on a position of the slider detected by the slider position detector, a position of the slider that has been set, the pulse condition that has been changed, and the speed feedback signal generated by the speed feedback signal generator.

* * * * *